(12) United States Patent
Hunt

(10) Patent No.: US 7,840,236 B2
(45) Date of Patent: Nov. 23, 2010

(54) CALL ROUTING

(75) Inventor: Lisa Hunt, Holmer Green (GB)

(73) Assignee: Nokia Corporation, Espoo (FI)

( * ) Notice: Subject to any disclaimer, the term of this patent is extended or adjusted under 35 U.S.C. 154(b) by 222 days.

(21) Appl. No.: 10/061,165

(22) Filed: Feb. 4, 2002

(65) Prior Publication Data

US 2003/0100293 A1 May 29, 2003

(30) Foreign Application Priority Data

Nov. 28, 2001 (GB) .................................. 0128497.5

(51) Int. Cl.
*H04M 1/00* (2006.01)
(52) U.S. Cl. .............. 455/564; 379/265.12; 379/266.02
(58) Field of Classification Search .............. 379/88.21, 379/308, 265.01–265.12; 455/414.1, 404, 455/418, 455, 456.3, 564, 417, 404.1, 414; 705/14
See application file for complete search history.

(56) References Cited

U.S. PATENT DOCUMENTS

| | | | | |
|---|---|---|---|---|
| 5,297,192 | A * | 3/1994 | Gerszberg .................. | 455/419 |
| 5,305,374 | A * | 4/1994 | Snyder ..................... | 379/88.06 |
| 5,309,513 | A * | 5/1994 | Rose ....................... | 379/265.12 |
| 5,388,148 | A * | 2/1995 | Seiderman ................ | 455/404.1 |
| 5,563,931 | A * | 10/1996 | Bishop et al. ............. | 455/404.1 |
| 5,742,666 | A | 4/1998 | Alpert | |
| 5,864,757 | A * | 1/1999 | Parker ..................... | 455/418 |
| 5,889,852 | A * | 3/1999 | Rosecrans et al. ....... | 379/355.05 |
| 6,085,111 | A * | 7/2000 | Andre ..................... | 455/550.1 |
| 6,167,255 | A * | 12/2000 | Kennedy et al. ......... | 455/414.1 |
| 6,307,929 | B1 | 10/2001 | Baiyor et al. | |
| 6,405,033 | B1 * | 6/2002 | Kennedy et al. ......... | 455/414.1 |
| 6,411,687 | B1 * | 6/2002 | Bohacek et al. .......... | 379/88.21 |
| 6,493,429 | B1 * | 12/2002 | Cannon et al. ........... | 379/88.01 |
| 6,546,239 | B1 * | 4/2003 | Pazdersky et al. ........ | 455/410 |
| 6,587,835 | B1 * | 7/2003 | Treyz et al. ............... | 705/14 |
| 6,633,754 | B1 * | 10/2003 | Raith ...................... | 455/404.1 |
| 6,687,497 | B1 * | 2/2004 | Parvulescu et al. ....... | 455/420 |
| 6,690,932 | B1 * | 2/2004 | Barnier et al. ............ | 455/414.1 |
| 6,721,404 | B1 * | 4/2004 | Lashley et al. ........... | 379/102.02 |
| 6,912,399 | B2 * | 6/2005 | Zirul et al. ................ | 455/463 |
| 7,016,656 | B2 * | 3/2006 | Odashima et al. ........ | 455/74.1 |
| 7,016,675 | B1 * | 3/2006 | Schuster et al. .......... | 455/433 |
| 7,376,415 | B2 * | 5/2008 | Surette ................... | 455/418 |
| 2001/0021646 | A1 * | 9/2001 | Antonucci et al. ....... | 455/404 |
| 2002/0006787 | A1 * | 1/2002 | Darby ..................... | 455/419 |

(Continued)

FOREIGN PATENT DOCUMENTS

DE 19856061 12/1997

(Continued)

OTHER PUBLICATIONS

M. Koscielny, et al, "Customizing Telecommunication Services: Patterns, issues and models" published 1999, Springer-verlag, pp. 194-209.

*Primary Examiner*—Simon Sing
(74) *Attorney, Agent, or Firm*—Ditthavong Mori & Steiner, P.C.

(57) ABSTRACT

Apparatus and method for routing calls made to a service centre to a call destination able to meet criteria preselected by the caller for the interaction with the service centre.

30 Claims, 3 Drawing Sheets

U.S. PATENT DOCUMENTS

| | | | |
|---|---|---|---|
| 2002/0055351 A1* | 5/2002 | Elsey et al. | 455/414 |
| 2004/0213391 A1* | 10/2004 | Yau et al. | 379/114.01 |
| 2006/0023865 A1* | 2/2006 | Nice et al. | 379/265.04 |
| 2007/0004424 A1* | 1/2007 | Sheen et al. | 455/456.1 |

FOREIGN PATENT DOCUMENTS

| | | |
|---|---|---|
| EP | 767568 | 4/1997 |
| JP | 60276284 | 9/1994 |
| WO | 9916228 | 4/1999 |
| WO | 0110152 | 2/2001 |
| WO | 0182556 | 11/2001 |

\* cited by examiner

CALL ROUTING

BACKGROUND OF THE INVENTION

1. Field of the Invention

The invention relates to a handheld communications device and services connected with such.

2. Description of the Prior Art

Communication devices such as mobile phones, have in the past, been provided with dedicated buttons to call a specific number to contact for example Barclays Bank for banking services or the RAC for vehicle assistance services. The person dialing is put in direct contact with any of the operators at the programmed service center.

With lives becoming ever busier, there are requirements for increasing convenience and more personalized services.

SUMMARY OF THE INVENTION

In accordance with a first aspect of the present invention there is provided a handheld personal communication device comprising a dedicated key for calling a predetermined destination service center providing for a plurality of respective modes of interaction for information transfer with incoming callers, the dedicated key having associated therewith data indicative of one of the plurality of respective modes of interaction, the data being provided in response to actuation of the key to select a call destination providing the selected mode of interaction.

In accordance with a second aspect of the present invention there is provided a method for providing a mode of interaction selected by an incoming caller at a service center, comprising: programming a dedicated key on a handheld personal communication device for calling a predetermined destination service center, the service center providing a plurality of respective modes of interaction with a caller for information to transfer on answering a call, providing on actuation of the dedicated key associated data representative of one of the modes of interaction; and routing a call from the handheld device to a destination terminal operating in the selected mode of interaction in response to the associated data routing information sufficient to identify the selected mode of interaction.

In accordance with a third aspect of the present invention there is provided a service center having a plurality of call destinations each having a respective mode of interaction for information transfer with incoming callers, comprising: a call router for receiving data indicative of a selected one of the modes of interaction associated with an incoming call and routing the incoming call in response to the data to the call destination providing the selected mode of interaction.

With the pressures of modern living, people are increasingly requiring instant results. Modern automated telephone answering services, although serving the purpose of reducing personnel requirements for routine information, appear correspondingly to increase the time investment for locating the information by users of the system.

The present invention provides the opportunity for specified preferences of the user to be predefined and included in information provided prior to a call being answered by a defined service provider. This enables information on the caller to be used to ensure the mode of interaction selected by the caller is utilized from the moment the call is answered, providing an efficient service for the user. The caller in effect preselects at least one criterion defining the way in which the call is answered. The call destination is the first time the call is answered. There is no requirement for user intervention to receive the required mode of interaction once the call has been made using the dedicated key.

In aspects of the invention the mode of interaction will be the technical mode of interaction of the communication equipment used to answer the call. As an alternative one of the modes of interaction may be via an individual having particular communication or language skills. For example, the mode of interaction may be the language spoken by, or the gender of, the person answering the call.

The modes of interaction specify the manner in which the call is answered rather than the service being provided. In embodiments of the invention, the information content being transferred is not dependent on the mode of interaction being provided on answering the call. Instead it is one or more of the parameters of delivery of the information that are determined. This provides the advantage that the same services will be provided to and the same information accessed by all users independent of the preference expressed regarding the preferred mode of interaction. The preference, therefore, is an additional layer to the service provision.

In embodiments of the invention where the mode of interaction is the language in which information is transferred, a user is able to speak in the most convenient language, for maximum understanding.

The data associated with the dedicated key may comprising routing information to direct a call to the selected call destination. In embodiments of the invention the routing information comprises a specific destination telephone number that is always operated in the desired fashion be it the mode of operation of the communication device at that number or the person answering. It may, however, comprise a specific destination switch that directs the call to a location or device operating in the desired fashion. The dedicated key may be programmed with the specific destination telephone number.

By providing the facility that the person answering the call will interact with the caller in a manner intertwined with the dialing process itself, there is no need for the additional transfer of information at the start of the call as may be the case if a caller requests to speak to for example an English speaker when a call is answered. The user can immediately access the service in the manner required.

BRIEF DESCRIPTION OF THE INVENTION

The invention will now be described in greater detail with reference to FIGS. 1 to 4 of the accompanying drawings of which:

DESCRIPTION OF THE INVENTION

Figure 1:
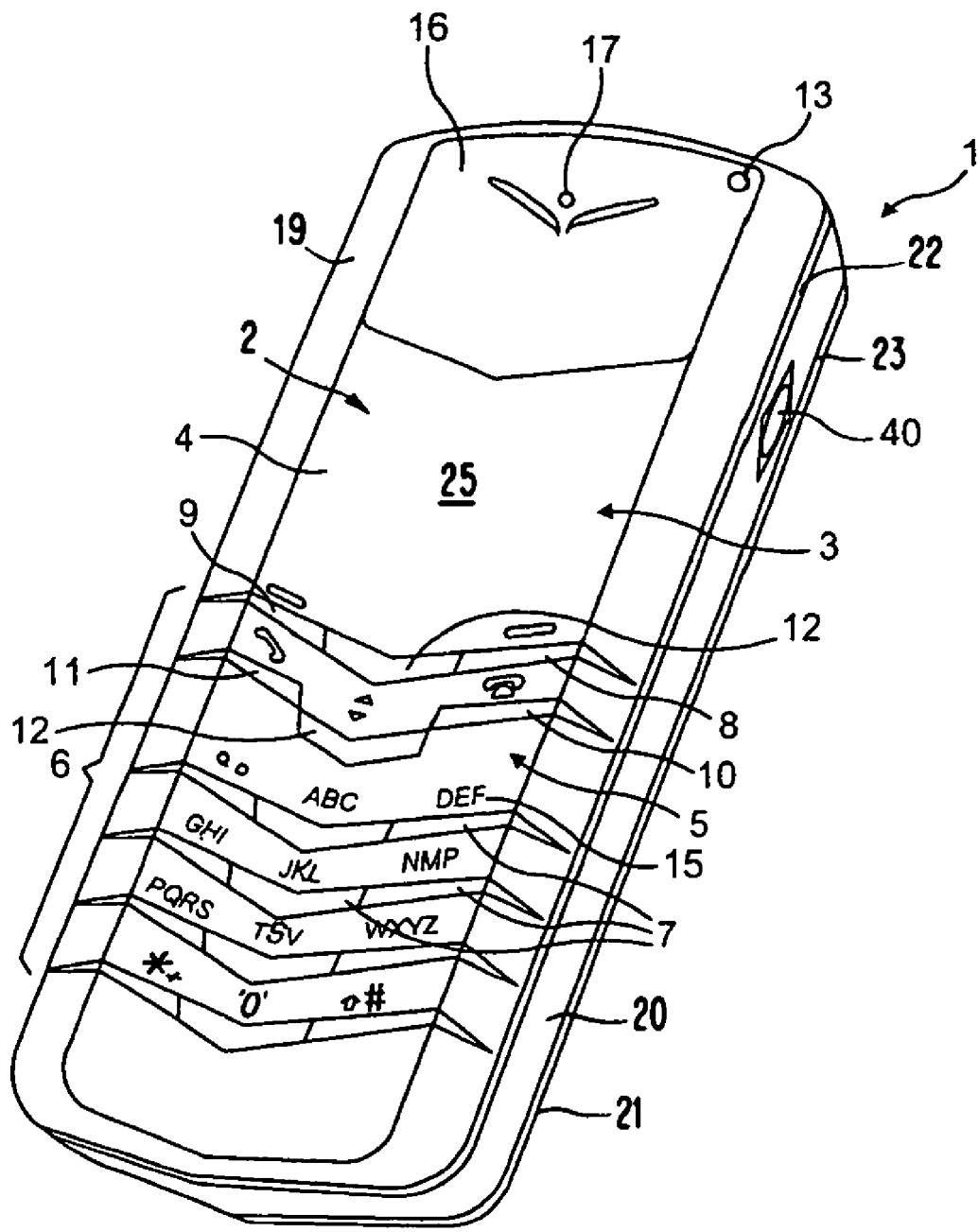
FIG. 1 is a perspective view of a communication device showing one embodiment of the invention.

A device of an embodiment of the present invention illustrated in FIG. 1 is a communication device 1 with a casing 2.

The casing 2 has a front face 3 providing a display region 4 and an input region 5 that includes a key array 6. The key array 6 includes a first group of alphanumeric keys 7, for entering telephone numbers, writing text messages (SMS), writing names (associated with phone numbers), etc. Each of the twelve alphanumeric keys 7 is provided with a figure "0-9" or a sign "#" or "*", respectively. In an alpha mode each key is associated with a number of letters and special signs used in text editing. The key array 6 additionally comprises two soft keys 8, 9, two call handling keys 10, 11, two scroll keys 12, and an on/off key 13.

The functionality of the soft keys 8, 9 may depend on the state of the communication device and position within the menu accessed using the scroll keys 12. The current functionality of the soft keys 8, 9 can be shown in separate fields in the display region 4 just above the respective keys 8, 9.

The two call handling keys 10, 11 are used for establishing a call 10 or a conference call, terminating a call 11 or rejecting an incoming call.

The two direction keys or scroll keys 12, in the handset illustrated are placed centrally on the front surface of the communication device between the display region 4 and the group of alphanumeric keys 7 perform a scrolling function.

This seamless face 3 is formed from a light guide providing light to illuminate the display region 4 and key legends 15 located on the seamless face 3 and associated with individual keys of the key array 6.

The front face 3 is overlaid with a pillow 16 providing apertures 17 to channel sound from a loud speaker and providing an appropriate feel for an element of the device that will be located close to the user's ear. The front face 3 is surrounded by a bezel 19 that can be made from a precious metal. This acts to protect the edges of the face 3 and can help in some embodiments in securing the elements of the casing 2 together.

The keys of the key array in this particular embodiment are arranged to provide particular sensory guidance to the user. Aspects of the design also allow the seamless face 3 to be made from a wide range of materials including those that are brittle and so need to be carefully handled and protected from shattering.

The casing 2 is formed from the front face 3 surrounded by the bezel 19, a side frame 20 and a back cover. The interface between the side frame 20 and the bezel 19 and the side frame 20 and the rear cover are shielded by rails 22, 23 in this embodiment. The construction of the casing 2 enables the opening with ease to update the electronics inside when desired.

The radio telephone 1 incorporates a dedicated key 40 that dials a programmed number automatically when pressed. In embodiments of the invention this will be accomplished either with or without the need to press the 'call' key 10 subsequently. The key can be provided with a key guard to avoid inadvertently calling the service center 42. The number associated with dedicated key 40 will dial a service center that provides a number of services.

In one embodiment of the invention the services include, technical support for the radio telephone, personal support allowing the owner of the telephone to gather information and tap in to exclusive services, and emergency assistance for the owner for example for medical help or roadside assistance. Other services 5 could, however, be provided.

Figure 2:
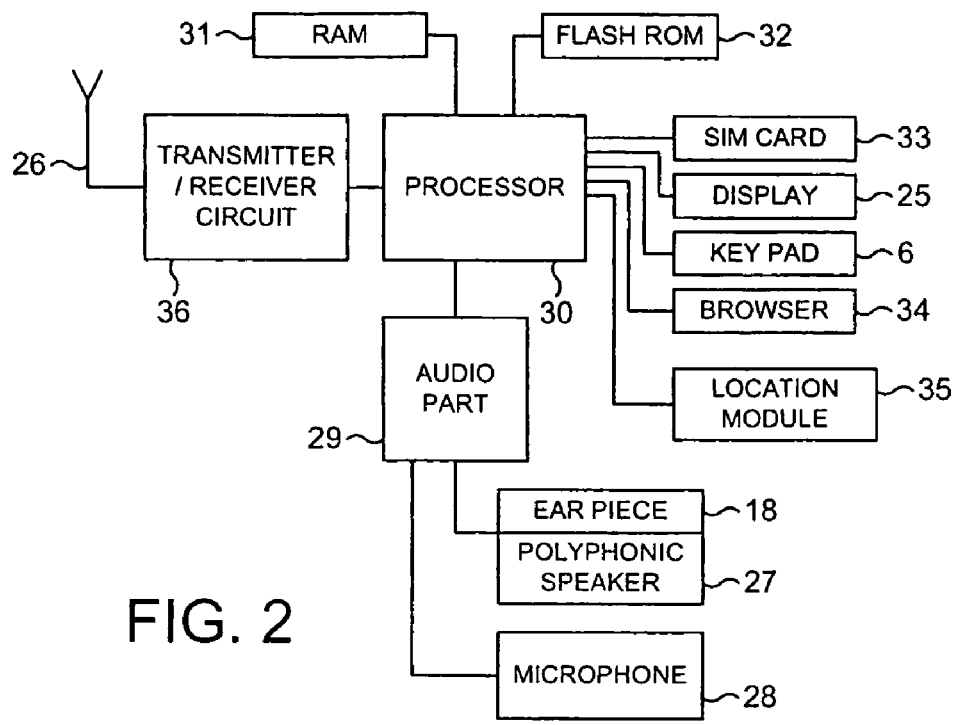
FIG. 2 is a schematic representation of a communication device suitable for embodiments of the present invention.
Figure 3:
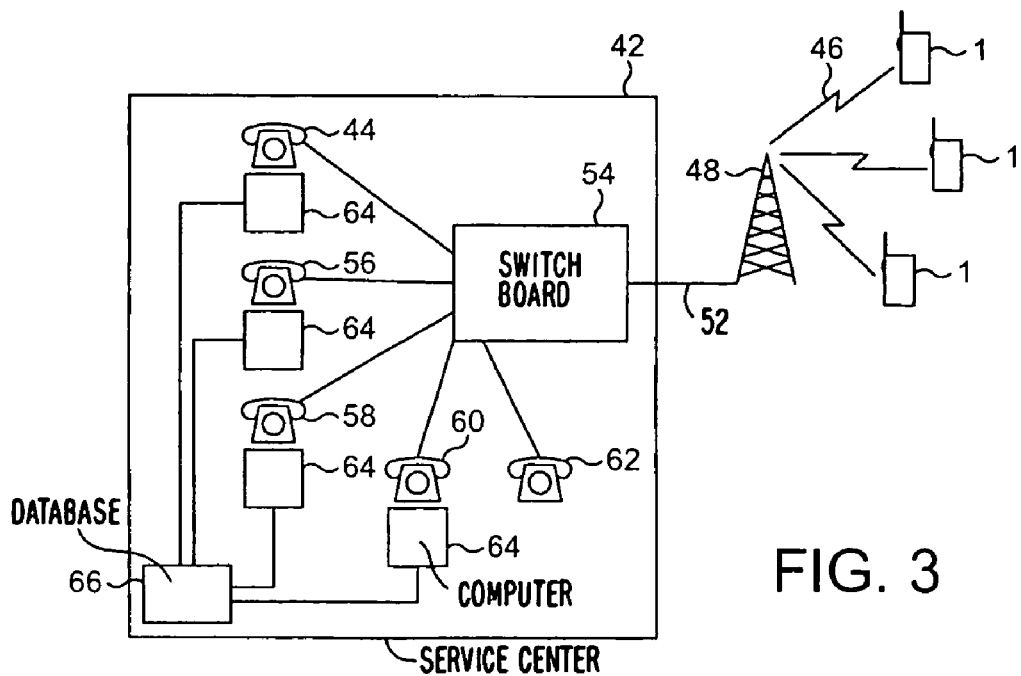
FIG. 3 is a schematic representation of a network for routing calls to a service center in accordance with embodiments of this invention.

The device will now be briefly discussed with reference to its functional elements. The radio telephone 1, includes the key array 6, a display 25, an antenna 26, an ear piece speaker 18, a polyphonic speaker 27, and a microphone 28. The communication device 1 is adapted for communication via a wireless telecommunication network, for example a wireless network. However, the communication device could also have been designed for a cordless network. FIG. 2 shows schematically and functionally elements of the communication device 1. The microphone 28 records the user's speech, and the analog signals formed thereby are ND converted by an ND converter before the speech is encoded in an audio part 29. The encoded speech signal is transferred to processor 30. The processor 30 may support software in the phone. The processor 30 also forms the interface to peripheral units of the apparatus. These may include a Random Access Memory (RAM) 31 and a Flash Read Only Memory (ROM) 32, a SIM card 33, the display 25, and the key array 6, and perhaps a browser application 34, and a location module 35.

The browser application 34 can be used to request and receive information from the Internet. The location module 35 enables the terminal 1 to determine its current position.

The processor 30 communicates with a transceiver 36, for example a circuit, which is adapted to send and receive messages in a telecommunication network. The telecommunications network may be a GSM network, but the invention may also be applied in connection with other networks, such as other kinds of wireless networks and various forms of cordless phone systems or in dual band phones accessing sets of these systems/networks. The audio part 29 speech-decodes the signal, which is transferred from the processor 30 to the earpiece 18 via a D/A converter.

The radio telephone incorporating a dedicated key 40 for calling the service center in accordance with this embodiment of the invention allows simple access to the services provided. In this embodiment the number associated with the dedicated key contains routing information sufficient to indicate that the call should be answered in a specific language, although other modes of interaction as discussed previously and others that will be apparent to persons of skill could be used instead, or in addition. In this embodiment the mode of interaction for example the language for answering the call is specified initially at the time of purchase of the radio telephone. This can be reprogrammed at a future date if the preference changes. This will be more likely for some preferences than for others for example language. It may also need to be changed if the service provider changes number or dialing code.

The selected mode of interaction, that is in this embodiment language, is associated with the routing information for connecting the radio telephone 1 to the service center 42 provided by the dedicated key 40. For example, a specific phone 44 always manned in Arabic will ring in response to the button being pressed. This could be the result of an over-the-air channel connection 46 to the mobile network 48, and a connection from the network 52 to the switch board 54 of the service provision center 42. The particular number dialed ensures the call is switched to the appropriate telephone 44 or desk out of those available, 44, 56, 58, 60, 62. One of the modes of interaction of the destination equipment is speaker phone mode.

As mentioned earlier, in the current embodiment, the mode of interaction is the language in which the call is answered but it could provide for other preferences such as the gender of the person answering, or could extend to a personal preference for say an automated response. In each of the instances the service itself or the information provided will not differ with the information preferences expressed in the concierge key. Two people calling the service center on different handheld devices one having a preference, say, for talking to a woman, and the other for talking to a man will each be provided with exactly the same range of options. It is just the manner of delivery of the options that will differ.

With caller ID available the caller will be able to be identified so a personal greeting can be made on answering the call. Over a period of time user preferences associated with a particular caller will be built up and tailored suggestions and information provided. This does not change the services provided and merely streamlines the delivery of useful information to the respective callers.

Caller ID can be sent when a number is dialed and could be used as an alternative to the dialed number to route the call to a destination operating in the user selected information transfer mode.

Figure 4:
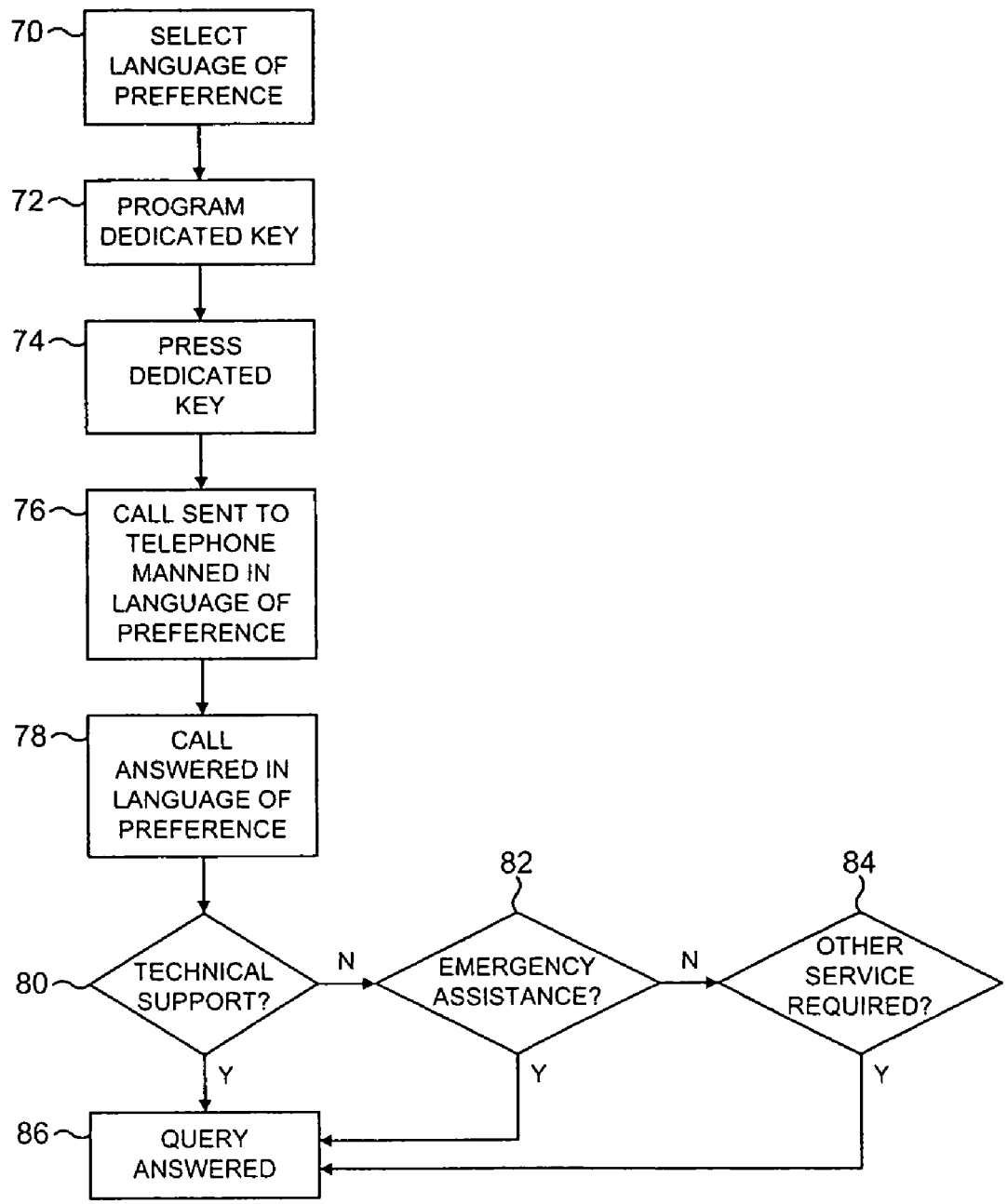
FIG. 4 is flow chart showing initial set up and future operation of an embodiment of the invention.

Turning now to FIG. 4, at the time of purchase in this embodiment of the invention the purchaser is asked for details of the language 70 that the concierge service should use when answering a query. The phone 1 is personalized by programming 72 a particular telephone number to be dialed when the dedicated key is pressed that is associated with the language that is to be used when responding to the call is the one selected. On pressing the key 74 the call will be routed 76 to a particular telephone that is always manned by an operator employed to speak in that language. Alternatively the programmed number may be for a phone with an automated message in the selected language. In alternative embodiments the call could be routed to a switch that is configured to send the call to an appropriate telephone currently manned by someone answering the phone in the particular language. Either of these mechanisms allows the service provider to be able to ensure that the call will be answered by a person speaking the language specified.

Once the phone has been answered 78, a range of services are available for the user. The call may be for technical support 80, for the emergency assistance 82 or for a range of information and leisure support 84. The services include, technical support, personal support, and emergency assistance. Each query will be answered 86 by an operator speaking in the language of preference. The services are linked to the owner of the device, and the device itself. In this way the service not only provides information useful to the owner of the device but is also supports the continued ability of the owner to access the information through technical support of the device. This may be information on how to operate the device, enter into additional operating contracts, obtain new features or software upgrades, or troubleshooting and help with repair should that become necessary.

The concierge service accessed through the dedicated button 40 on a radio telephone, that will direct calls to the service from any national or international location, provides an exclusive service for people possessing the radio telephone 1 (the key to accessing the service). A specialist support team operating in a range of languages offered as reference provides information and help in accessing opera, art, travel, or food in addition to providing clear and concise product support for the handheld device primarily used for accessing the system and emergency assistance. The operators will be provided with data to allow all such queries to be answered. The data may be supplied in connection with computers 64 with access to an extensive database 66, and/or internet access, and or books or other sources of information. The operators may also be able to access information through additional phone calls. If a user's query cannot be answered with reference to data at the operators command, a team of researchers will work on providing an answer. These researchers will be adding to the data available in the data base to keep up with emerging trends and new requirements.

The concierge service provides information, recommendations, and even help with reservations at hotels, restaurants and theatres. It can locate specific products and services through a global network of contacts and can even offer exclusive client benefits and offers that may apply at particular key locations. The range of services and benefits offered can be augmented or otherwise altered to keep up with changing trends. All the information will be transferred to the user in the mode selected, for example in the appropriate language or by an operator of the requested gender. The information available will be independent of the route for calling the service center, in particular the particular number dialed on pressing dedicated key, but the manner of delivery of the information will be dictated by the route, in this case determined by the number stored in association with the dedicated key.

Services that are provided may help the traveler by providing special offers and advice, such as automatic upgrades at specific hotels, and special rates exclusively for members. Help with holiday or business trip arrangements can be provided through partnerships with suitable travel specialists. In addition, the service will endeavor to locate tickets for exclusive events even if these are sold-out events, be they sporting or cultural. Entrance to other venues that often require private membership may also be secured.

The service will enable travelers to obtain access to popular events without booking years in advance which is not always possible or desirable for the business or spur of the moment traveler who is not aware from one week to another of his/her likely location.

Another wing of the service may secure restaurant reservations at short notice for popular restaurants. As well as providing advice on where to eat in an unfamiliar, or familiar for that matter, location.

The personalized answering mode of the concierge service can also deliver information about emergency assistance should medical, legal, or other services, be required especially whilst traveling.

With the concierge service both the information available through the service for enhancing the life of the user and the means by which the information is accessed (via the handset) is supported by the service center.

The aspects of the invention have been discussed with reference to a radio telephone. It will be clear to the skilled person that these apply equally to other portable communications devices supporting other functions, such as electronic diaries, notepads amongst others.

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. An apparatus comprising
at least one processor; and
at least one memory including computer program code,
the at least one memory and the computer program code configured to, with the at least one processor, cause the apparatus to perform at least the following,
independently and locally program at the apparatus a dedicated key of the apparatus to call a predetermined destination service center for a selected one of a plurality of modes of interaction independent of a number and a route for calling the destination service center, wherein the destination service center provides a plurality of call destinations for providing the plurality of modes of interaction, wherein each mode of interaction specifies a manner in which a call is answered, the dedicated key is associated therewith data indicative of the selected of interaction, and the data is provided upon actuation of the dedicated key to select a call destination within the destination service center providing the selected mode of interaction without user intervention; and update the data associated with the dedicated key so as to enable a call destination providing a different selected mode of interaction upon actuation of the dedicated key.

2. An apparatus according to claim 1, wherein the associated data comprises routing information.

3. An apparatus according to claim 2, wherein the routing information comprises a destination telephone number.

4. An apparatus according to claim 3 wherein the dedicated key is programmed with the destination telephone number.

5. An apparatus according to claim 2, wherein the routing information comprises a destination switch.

6. An apparatus according to claim 1, wherein the apparatus is a mobile terminal, and the selected mode of interaction is defined by a user of the mobile terminal.

7. An apparatus according to claim 1, wherein the apparatus is a mobile terminal, and the selected mode of interaction is defined at purchase of the mobile terminal.

8. An apparatus according to claim 1 wherein the mode of interaction comprises a language selected for information transfer.

9. An apparatus according to claim 1 wherein the mode of interaction comprises gender of a person answering.

10. An apparatus according to claim 1, wherein the selected mode of interaction comprises a mode of operation of communication equipment used to answer the call.

11. An apparatus according to claim 10, wherein the mode of operation of the communication equipment comprises a speakerphone mode.

12. An apparatus according to claim 1, wherein the selected mode of interaction comprises a manner of delivering information when answering a call.

13. An apparatus according to claim 1, wherein the selected mode of interaction comprises a mode of operation of communication equipment used to deliver information when answering a call.

14. A method comprising:
independently and locally programming at a handheld personal communication device a dedicated key on the handheld personal communication device to call a predetermined destination service center for a selected one of a plurality of modes of interaction independent of a number and a route for calling the destination service center, the destination service center providing a plurality of call destinations for providing the plurality of modes of interaction, wherein each mode of interaction specifies the manner in which the call is answered, the dedicated key is associated therewith data indicative of the selected mode of interaction, and the data is provided upon actuation of the dedicated key to select a call destination within the destination service center providing the selected mode of interaction without user intervention; and updating the data associated with the dedicated key so as to enable a call destination providing a different selected mode of interaction upon actuation of the dedicated key.

15. A method according to claim 14, wherein the associated data comprises routing information.

16. A method according to claim 15, wherein the routing information comprises a destination telephone number.

17. A method according to claim 15, wherein the dedicated key is programmed with the destination telephone number.

18. A method according to claim 14, wherein the routing information comprises a destination switch.

19. A method according to claim 14, wherein the selected mode of interaction is predefined by a user of the handheld device.

20. A method according to claim 14, wherein the selected mode of interaction is defined at purchase of the handheld device.

21. A method according to claim 14 wherein the mode of interaction comprises a language selected for information transfer.

22. A method according to claim 14 wherein the mode of interaction comprises gender of a person answering.

23. A device comprising a dedicated key independently and locally programmed to call a predetermined destination service center,
wherein the dedicated key of the device is independently and locally programmed to call the destination service center for a selected one of a plurality of modes of interaction independent of a number and a route for calling the destination service center,
wherein the destination service center provides a plurality of call destinations for providing the plurality of modes of interaction,
wherein each mode of interaction specifies the manner in which a call is answered, the dedicated key is associated therewith data indicative of the selected mode of interaction, and the data is provided upon actuation of the dedicated key to select a call destination within the destination service center providing the selected mode of interaction without user intervention,
wherein the information transferred is delivered according to delivery parameters and the mode of interaction defines one or more of the delivery parameters but not the information transferred such that the information transferred does not differ between different call destinations, and
wherein the device is configured to update the data associated with the dedicated key so as to enable a call destination providing a different selected mode of interaction upon actuation of the dedicated key.

24. A computer-readable storage medium carrying one or more sequences of one or more instructions which, when executed by one or more processors, cause an apparatus to at least perform the following steps:
independently and locally programming at a handheld personal communication device a dedicated key on the handheld personal communication device to call a predetermined destination service center for a selected one of a plurality of modes of interaction independent of a number and a route for calling the destination service center, the destination service center providing a plurality of call destinations for providing the plurality of modes of interaction, wherein each mode of interaction specifies the manner in which the call is answered, the dedicated key is associated therewith data indicative of the selected mode of interaction, and the data is provided upon actuation of the dedicated key to select a call destination within the destination service center providing the selected mode of interaction without user intervention;

updating the data associated with the dedicated key so as to enable a call destination providing a different selected mode of interaction upon actuation of the dedicated key.

25. A computer-readable storage medium according to claim 24, wherein the associated data comprises routing information.

26. A computer-readable storage medium according to claim 25, wherein the routing information comprises a destination telephone number.

27. A mobile device comprising a dedicated key,
wherein the dedicated key of the device is independently and locally programmed to call a predetermined destination service center for a selected one of a plurality of modes of interaction independent of a number and a route for calling the destination service center,
wherein the destination service center provides a plurality of call destinations for providing the plurality of modes of interaction,
wherein each mode of interaction specifies the manner in which a call is answered, the dedicated key is associated therewith data indicative of the selected mode of interaction, and the data is provided upon actuation of the dedicated key to select a call destination within the destination service center providing the selected mode of interaction without user intervention, and
wherein the mode of interaction is a mode of operation of communication equipment used to answer a call.

28. A mobile device according to claim 27, wherein the associated data comprises routing information.

29. A mobile device according to claim 28, wherein the routing information comprises a destination telephone number.

30. A method, comprising:
independently and locally programming at a handheld personal communication device a dedicated key on the handheld personal communication device to call a predetermined destination service center for a selected one of a plurality of modes of interaction independent of a number and a route for calling the destination service center, the destination service center providing a plurality of call destinations for providing the plurality of modes of interaction, wherein each mode of interaction specifies the manner in which the call is answered, the dedicated key is associated therewith data indicative of the selected mode of interaction, and the data is provided upon actuation of the dedicated key to select a call destination within the destination service center providing the selected mode of interaction without user intervention, and
in response to actuation of the dedicated key, routing a call from the handheld device to a call destination at the destination service center operating in the selected mode of interaction according to the data,
wherein the mode of interaction is a mode of operation of communication equipment used to answer a call.

* * * * *